C. BARBIERI.
MOLDING MACHINE FOR PLASTIC MATERIAL.
APPLICATION FILED NOV. 2, 1916.
1,238,980.
Patented Sept. 4, 1917.
8 SHEETS—SHEET 8.
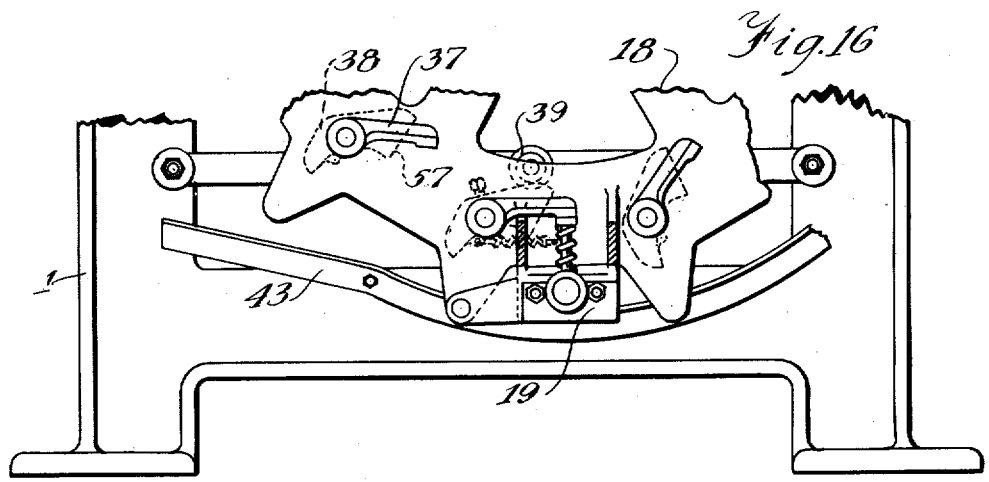
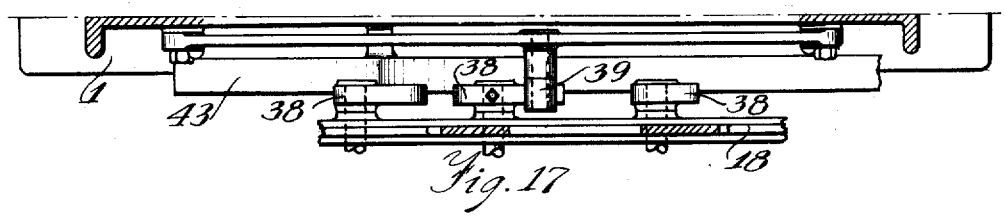
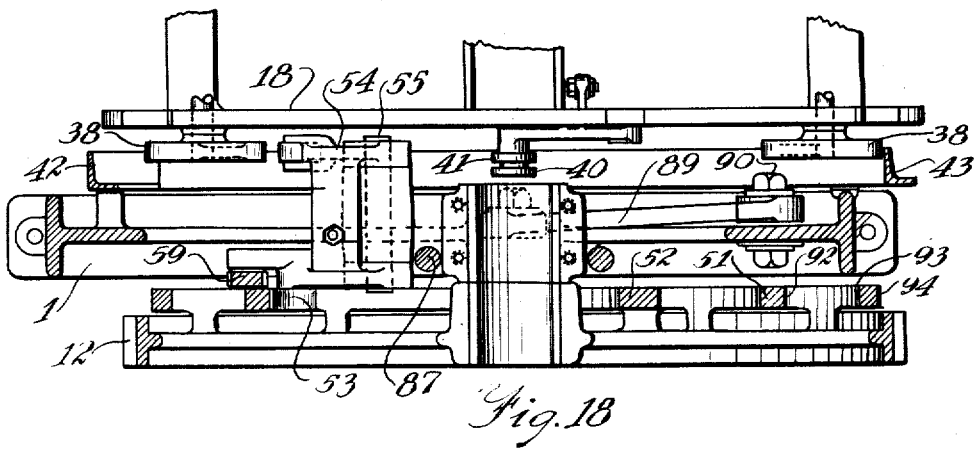
Witness
George C Schultz
Inventor
Cesare Barbieri,
By Rummler & Rummler
Attys

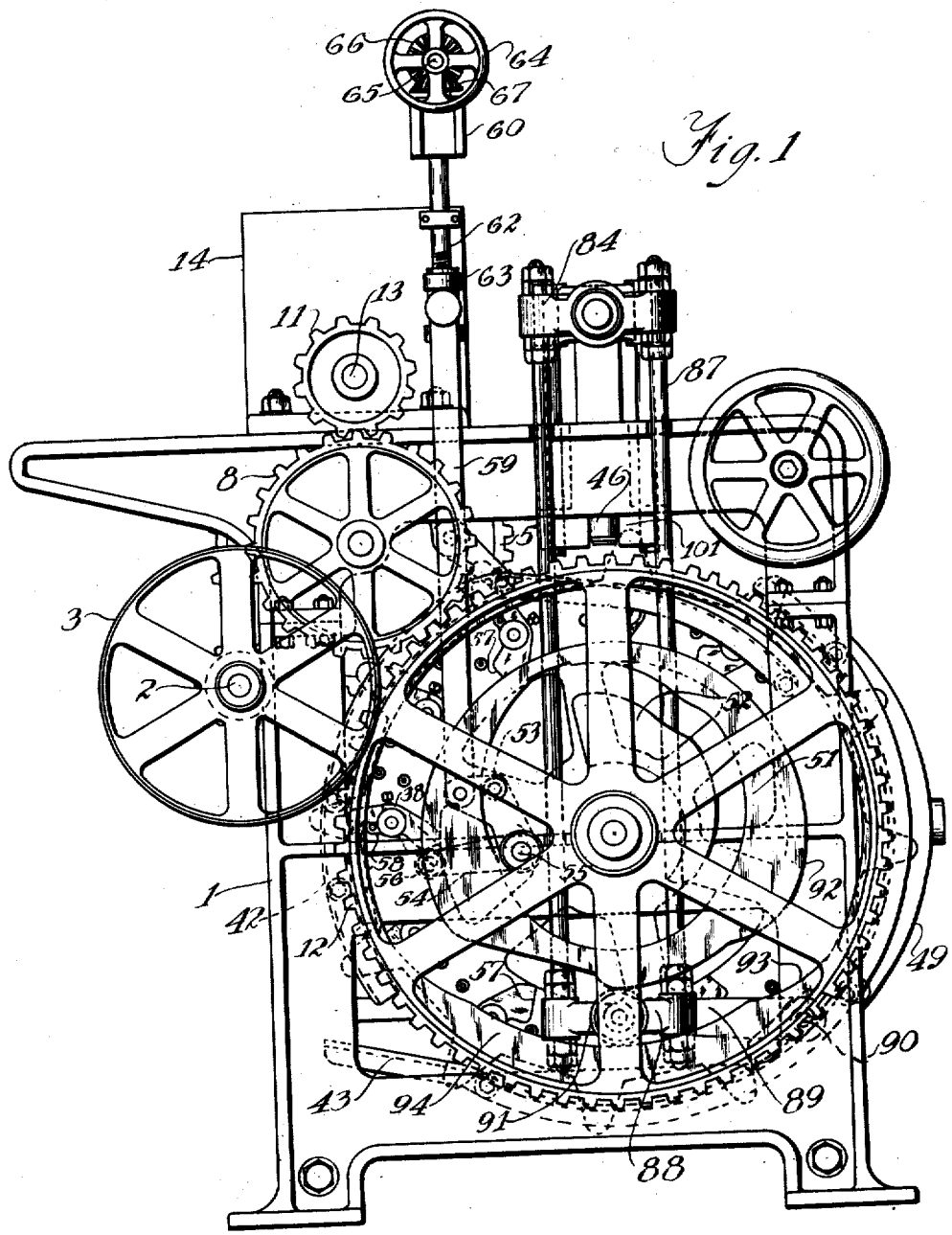

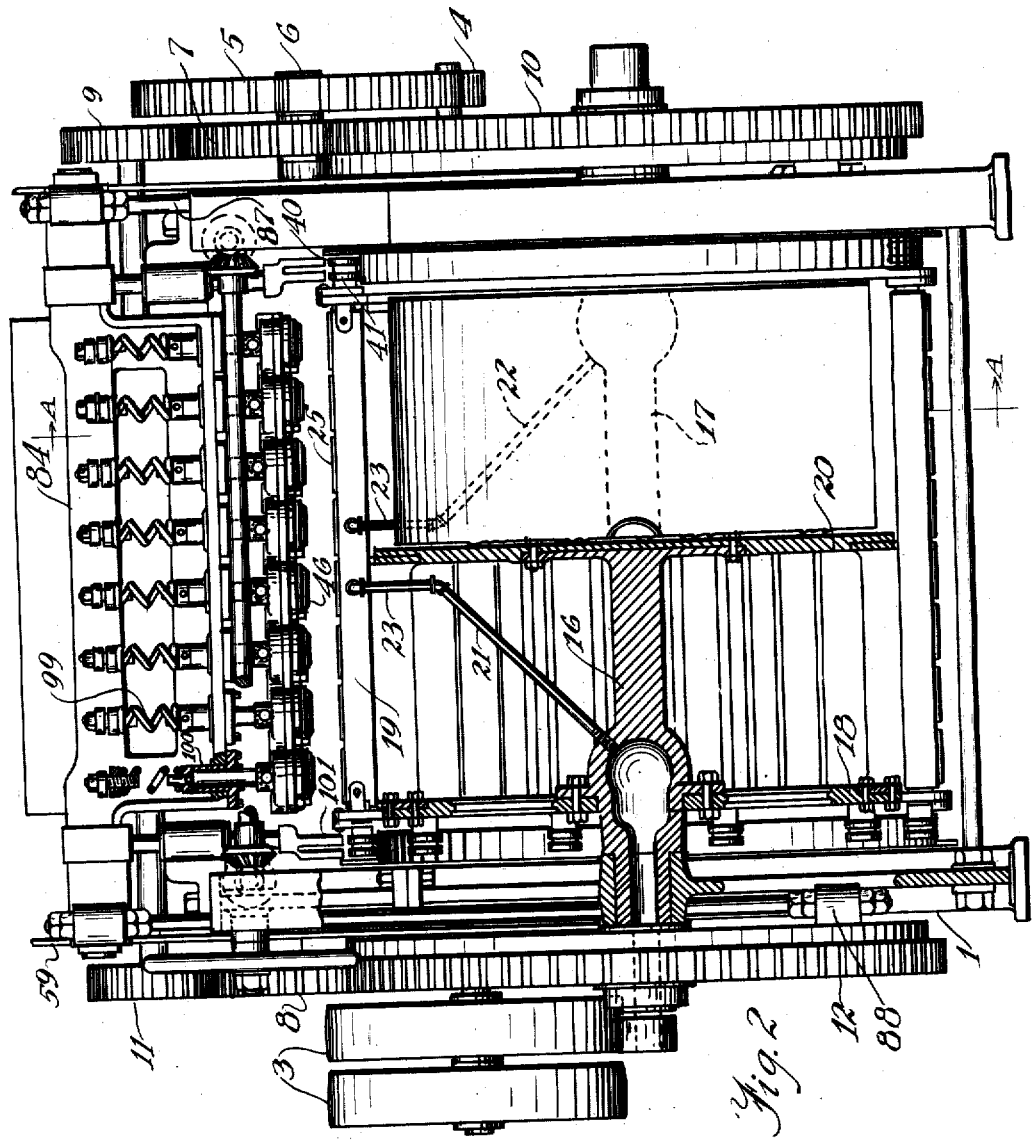

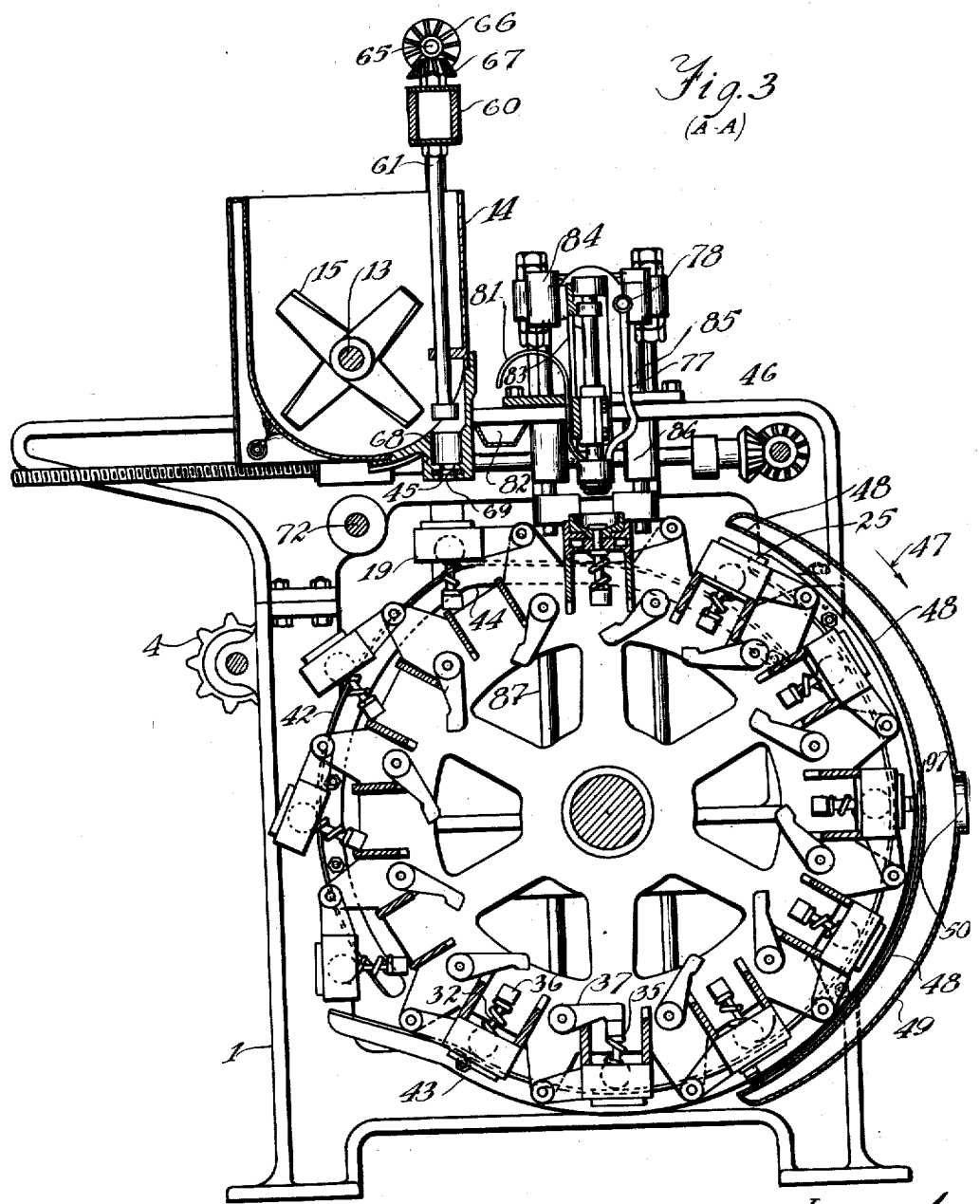

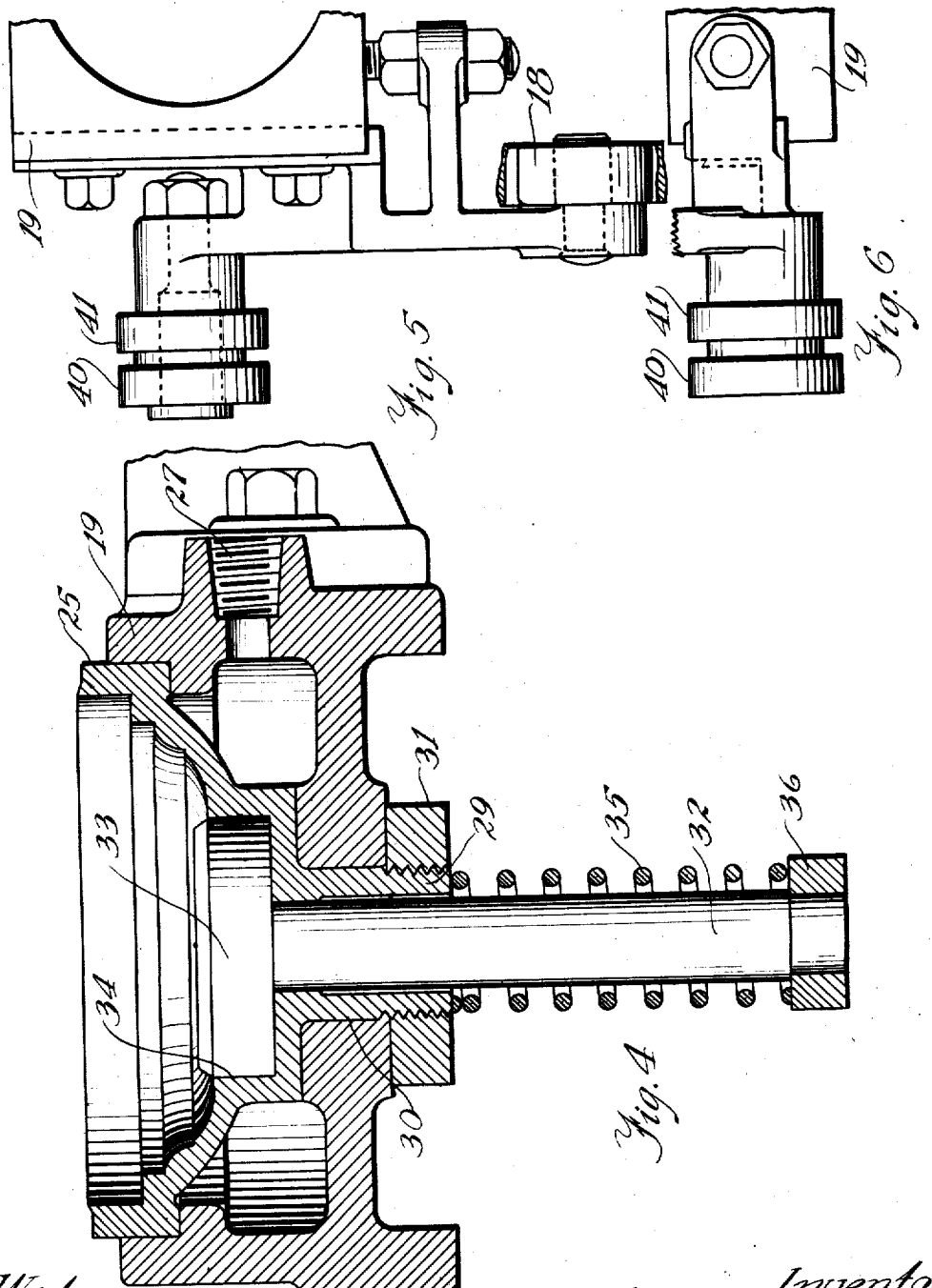

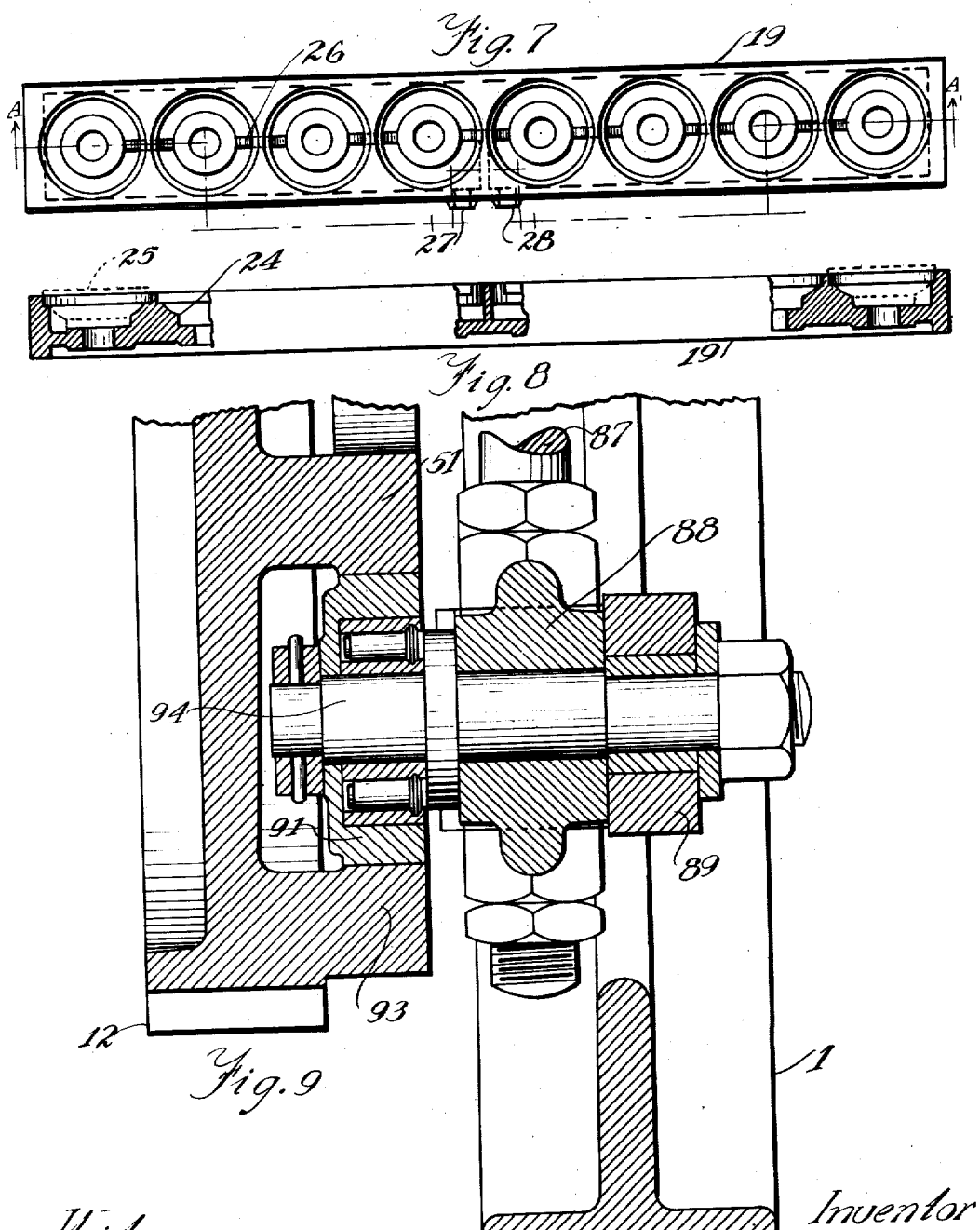

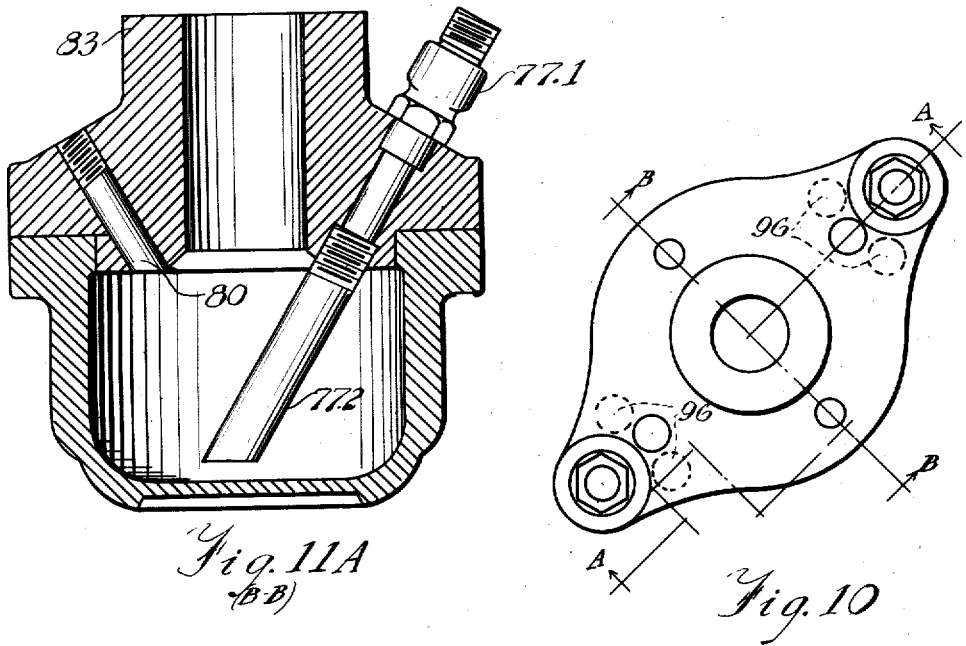
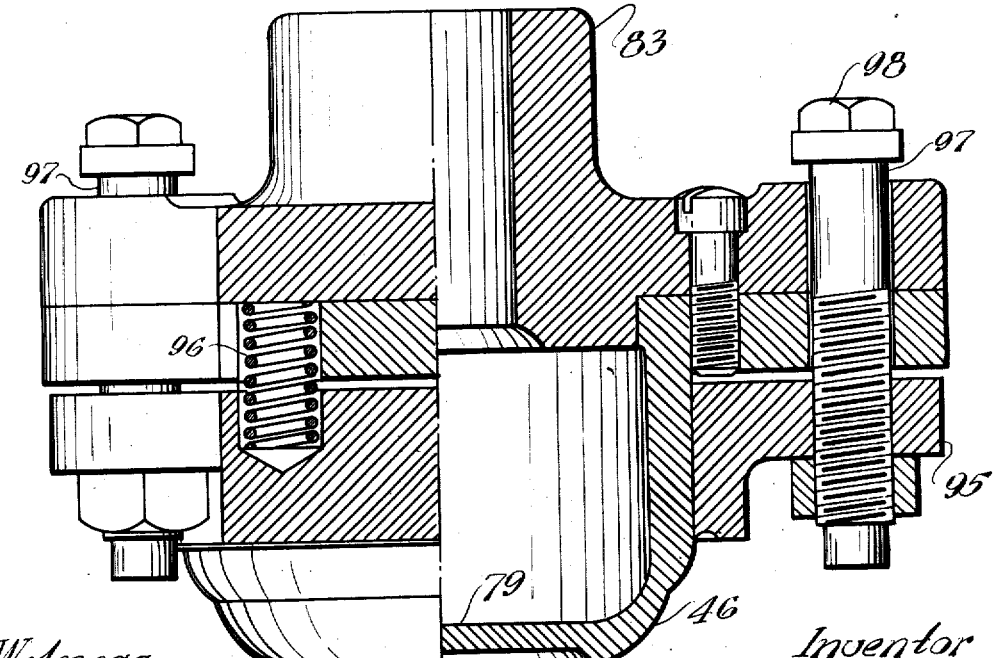

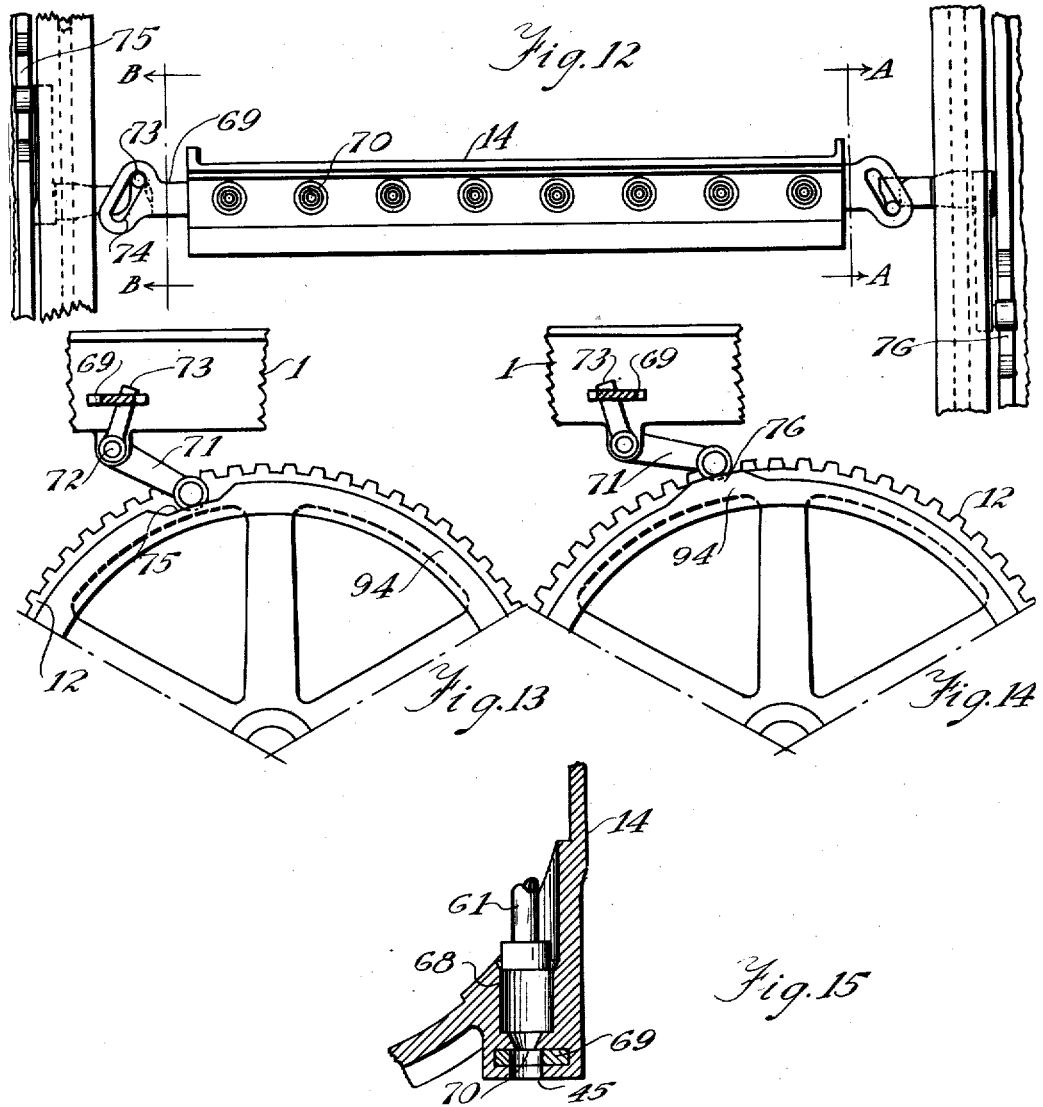

UNITED STATES PATENT OFFICE.

CESARE BARBIERI, OF CHICAGO, ILLINOIS, ASSIGNOR TO BLACK PRODUCTS CO., OF RIVERDALE, ILLINOIS, A CORPORATION OF ILLINOIS.

MOLDING-MACHINE FOR PLASTIC MATERIAL.

1,238,980.

Specification of Letters Patent.   Patented Sept. 4, 1917.

Application filed November 2, 1916.   Serial No. 129,098.

*To all whom it may concern:*

Be it known that I, CESARE BARBIERI, a subject of the King of Italy, and a resident of Chicago, county of Cook, and State of Illinois, have invented certain new and useful Improvements in Molding-Machines for Plastic Material, of which the following is a specification.

This invention relates to machines for forming articles from plastic material, and the embodiment thereof shown in the drawing is designed with reference to the production of disk-shaped targets of fragile material such as coal tars mixed with crushed limestone.

The objects of the invention are to provide various improved mechanisms for measuring, feeding and forming into the desired shapes plastic material; to provide a rotary type of machine with improved means for maintaining the dies in horizontal position during the feeding and forming operations; to provide improved means for cooling the dies and also improved means for cooling and shrinking the articles formed, by direct application of an air blast while such articles are still supported in one of the sets of coöperating dies; to provide improved means for guiding pivotally mounted dies on a rotary drum so that these dies will assume the proper position for loading, stamping, cooling and delivering operations; to provide improved means for intermittently driving the die holder support or drum; and to provide various improvements in constructional features which will hereinafter be explained.

An illustrative embodiment of this invention is shown in the accompanying drawings, in which—

Figure 1 is a side elevation of a molding machine constructed in accordance with this invention.

Fig. 2 is a front view of the machine, showing the die supporting drum partly in section.

Fig. 3 is a transverse vertical section taken on the line A—A of Fig. 2.

Fig. 4 is a sectional detail on one of the pivoted die holders and shows the construction of the die supported therein and the discharging plunger.

Fig. 5 is a fragmentary plan view of one of the die holders.

Fig. 6 is a detail of a guide roller bracket secured to the die holder.

Fig. 7 is a plan view of a die holder.

Fig. 8 is a fragmentary sectional view of a die holder.

Fig. 9 is a detail of a gear and cam integral therewith, and a cross head which is reciprocated by said cam and serves to operate the loading device.

Fig. 10 is a plan view of one of the plunger dies.

Fig. 11 is a sectional view of a plunger die taken on the line A—A of Fig. 10.

Fig. 11^A is a sectional detail of a plunger die taken on the line B—B of Fig. 10.

Fig. 12 is a detail in plan of an apertured slide for controlling the flow of plastic material into the dies.

Figs. 13 and 14 are details of cams for operating the slide.

Fig. 15 is a detail in section of a plunger and measuring cup for regulating the quantity of material discharged to the dies.

Fig. 16 is a fragmentary detail in side elevation showing mechanism for positively discharging completed articles from the dies.

Fig. 17 is a plan view of the mechanism shown in Fig. 15.

Fig. 18 is a sectional detail in plan showing the guide means for controlling the angular setting of the die holders on the rotary die support.

The present machine is intended for handling sticky, plastic material when heated, forming such material into articles of desired shape and cooling and contracting the articles away from the forming dies and discharging such articles from one set of dies while other sets of dies are being loaded, others going through the forming operation, and still others are supporting the formed articles during the chilling or hardening operations. The machine as shown in the drawings comprises in general a supporting structure having mounted at its upper end a stirring or mixing vat provided with suitable measuring and discharging devices at the lower end thereof. At one side of the stirring vat is a plurality of reciprocating plungers suitably formed to cooperate with convex dies. The latter are mounted in a plurality of oscillating frames which in turn are pivoted to a rotary frame or drum. Suitable means are provided for imparting an intermittent motion to said drum, and during this operation, the oscillating die holders are guided as required for receiving plastic material while the holders are in horizontal position and also properly supporting these dies during the forming operation, when the reciprocating plunger dies are engaged therewith.

Improved means are provided for centering the oscillating dies with respect to the plunger dies, and provision is made for circulating a cooling medium such as water around the dies and for projecting streams of air against the formed articles while still in the dies.

The supporting structure or frame 1 is shown in the drawings as provided with journals for the driven shafts of the machine. The main drive shaft 2, having pulleys 3 thereon, also carries fast a pinion 4 meshing with a gear 5 on the opposite side of the machine from the pulleys 3. A shaft 6, which rigidly carries the gear 5, also carries a pair of gears 7 and 8 respectively meshing with gears 9 and 10, and 11 and 12. A shaft 13 on which the gears 9 and 11 are fast, passes through a stirring vat 14 and carries inclined stirring blades 15 located within the vat. The large gears 10 and 12 are respectively secured to hollow axles 16 and 17, (Fig. 2) which serve to support a die supporting frame 18 and also to conduct a cooling fluid into and out of the die holders 19 supported on said frame. The axle sections 16 and 17 are bolted together and to a central supporting disk 20 for the frame or drum 18. Pipes 21 and 22 lead from the hollow portions of the axles 16 and 17 to flexible tubes 23 leading to and from the hollow die holders 19.

The die holders 19 are in the form of hollow drums as shown in Figs. 7 and 8, having suitable recesses 24 for receiving concave dies 25 shown in dotted lines in Fig. 8 and in full lines in Fig. 4. Central longitudinal ribs 26, (Fig. 7) extend between the recesses 24 to compel the water or other cooling fluid to pass around the die holder in contact with the inner surfaces of dies 25 which are exposed therein. The water may be caused to travel through the die holders under pressure from a pipe leading into the end of hollow axle 16 and from thence through the pipe 21 through tube 23, inlet 27 of the die holder and around all of the dies therein and out through the outlet 28 and connections to axle 17. Each of the dies 25 as shown in Fig. 4 is provided with a sleeve 29 passing through an aperture 30 in the inner side of its respective die holder. This sleeve is threaded to receive a nut 31 whereby the die may be firmly clamped to the die holder. The stem 32 of a discharge plunger is slidable within sleeve 29, the head 33 of such plunger resting in a recess 34 of the die. The plunger is normally urged into the position in which it is shown in Fig. 4 by a spring 35 encircling the part 32 of the plunger and compressed between sleeve 29 and a collar 36 on the plunger.

At the proper time during the rotation of the die supporting drums 18, the plungers 32 are operated against the action of springs 35 to eject the finished articles from the dies. The means for so operating the plungers is shown in Figs. 3 and 16 and comprises a plurality of dogs 37 pivotally mounted on the drum adjacent to the die holders 19 rigid with dogs 38 which engage a stationary roller 39 and are thereby cammed downwardly, causing the dogs 37 to engage collars 36 of the plungers and project the same downwardly.

For the purpose of controlling the oscillation of the die holders 19 around their pivotal connections with drum 18, each of the die holders carries at its ends pairs of spaced rollers 40 and 41. These rollers engage fixed tracks 42 and 43 supported on frame 1. The track 42 as shown in Fig. 3 is substantially horizontal at its upper end 44, for the purpose of maintaining the die holders in horizontal position as they come to rest beneath the discharge apertures 45 in the vat 14 and the forming plungers 46 which are mounted for reciprocation in the upper part of frame 1. The tracks 43 serve to guide the die holders 19 as they pass from the forming plungers 46 to the point of discharge at the bottom of the machine.

During this part of the travel of the die in the direction indicated by the arrow 47 in Fig. 3, the articles which are formed of the plastic material and exposed in the dies 25 are subjected to the cooling action of streams of air from apertures 48 in the nozzle member 49. The air is forced under pressure into the member 49 through the inlet 50 thereof.

Intermittent step-by-step motion is imparted to the drum 18 by means of cams 51 and 52 which may be integral with the gears 10 and 12 and operate on rollers 53 (Fig. 1) on bell crank levers 54 pivoted to the frame 1 by stub shafts 55. The lower arm of bell crank lever 54 carries a roller 56 which during the rocking motion of the bell crank lever engages the surfaces 57 of dogs 38 on the drum 18. When the dogs 38 are engaged by rollers 56, they are prevented from rocking on their pivots by the stops 58 but may freely be rocked in the opposite direction when engaged by the rollers 39 (Fig. 16).

The upper arms of bell crank levers 54 are connected by links 59 to a frame 60 which is reciprocated thereby. This frame carries a plurality of feed plungers 61 and is adjustably connected to the upper end of links 59 by threaded rods 62 passing through nuts 63 at the upper ends of the links 59. Rods 62 may be rotated for the purpose of adjusting frame 60 with respect to the reciprocating links 59 by means of a hand-wheel 64. This wheel is fast to a shaft 65 carrying miter gears 66 meshing with gears 67 fast to rods 62. The extent of reciprocation of frame 60 under the action of bell crank levers 54 is constant, but the adjustment of the frame causes the plunger 61 to project more or less into the measuring apertures 68, during the reciprocation of the plungers. The measuring apertures 68 may be formed in the bottom of receptacle 14 as shown in Fig. 15. Between the measuring apertures 68 and the outlet apertures 45 is a slide 69 having apertures 70 which may be caused to register with the apertures 45. The slide 69 is reciprocated for the purpose of causing the apertures 70 and 45 to register at the required times by means of bell crank levers 71 pivotally mounted on the frame 1 by means of shafts 72. The upper arms of bell crank levers 71 are provided with rollers 73 projecting into inclined slots 74 in the slide 69. The oscillation of bell crank levers 71 is controlled by cams 75 and 76 (Figs. 13 and 14) rigid on the frame or drum 18.

The forming plungers 46 are constructed as shown in Figs. 10 and 11, being hollow to provide for the circulation of water therethrough. The water is conducted to the plungers through a feeder pipe 78, (Fig. 3) having flexible pipe connections 77 with each of the plungers. The pipes 77 communicate with pipes 77.1 tapped into the plunger and provided with nozzles 77.2 in the inside of the plungers, suitably located to project streams of water against the bottom inner surfaces 79 thereof. The water is conducted out of the plungers through the outlets 80 into which are tapped bent pipes 81 which deliver the water to troughs 82. By thus delivering the water in exposed streams from the pipes 81, an operator may easily observe whether there is a proper circulation of water through each of the plungers. The plunger dies 46 are mounted for reciprocation in the frame 1 as shown in Fig. 3, the shank 83 of each of the plungers being secured to a cross-head 84 which is suitably guided by rods 85 secured thereto and passing through guides 86 in the frame 1. The cross-head 84 is connected by rods 87 to a cross-head 88, (Fig.1), which is pivotally supported on arms 89 pivoted at 90 to the bottom part of the frame 1. The arms 89 carry rollers 91 which coöperate with the outer surfaces 92 of cams 51 and the inner surfaces 93 of cams 94, preferably integral with gears 10 and 12 as shown in Fig. 9. This figure also shows the hollow shafts 94 upon which the rollers are journaled pass through cross-head 88 and are secured to arms 89.

The plunger dies 46 are encircled by spring pressed stripper rings 95 as shown in Fig. 11, which bear against the dies 25 during the downward stroke of the plungers and remain in contact with such dies during the first part of the upward stroke of the plungers, thereby insuring that the articles formed will not stick to plungers 46. The springs for controlling the action of strippers 95 are indicated by the numeral 96 and rods 97 projecting upwardly from the strippers, guide the same through the flange part 98 of the plunger dies. The shanks 83 of the plungers bear against coiled springs 99 mounted in the cross-head 84 to provide for a resilient mounting of the plungers in the guides 11 provided in the lower part of the cross-head.

The cross-heads 84 are provided with alining devices 101 in the form of prongs for respectively engaging at opposite sides of rollers 41 and 40 on the die holders 19. During the downward movement of cross-heads 84, the aliners by engaging rollers 40 and 41 properly center the dies 25 with respect to the plunger dies 46.

In the operation of the device, the plastic material is fed into the receiver 14 in heated condition. The stirring blades 15 are continuously rotated in the direction indicated by the arrow in Fig. 3, causing the material to be fed toward the measuring apertures 68. As the drum 18 is intermittently rotated by means of the rollers 56 on the bell crank levers 54 (Fig. 1) engaging dogs 38, the die holders 19 periodically come to rest in horizontal position below the discharge apertures 45. While so at rest, further rotation of the gears 10 and 12 causes the cams thereon to restore the bell crank levers 54 to their initial position through the links 59, causing the feed plungers 51 to project downwardly and force the proper quantity of plastic material into the measuring cups 68. The slide 69 toward the latter part of this operation is shifted to cause the apertures 70 therein to register with the discharge outlets 45, thus permitting the plunger 61 to force the material in the measuring apertures 68 into the dies 25. While this operation is taking place, the set of dies 25 which have previously been loaded are beneath the plungers 46 and these plungers are caused to travel downwardly into engagement with the dies 25 through the springs 99 and by action of the cross-heads 84 under the control of cam surfaces 92 and 93 operating on rollers 91 and which are connected through the rods 87 with cross-heads 84. During the intermittent rotation of the drum 18, the dies 25 in which the articles are formed successively come to rest before the apertures 48 in the nozzle member 49, and the streams of air from said nozzle member serve to chill the exposed surfaces of such articles, while the inner surfaces thereof are being cooled through contact with the dies 25 around which water is continuously circulating. During this part of the travel of the die holders, the articles formed in the dies 25 are prevented from dropping out by bars 97 which extend over the edges of the dies. When the dies 25 arrive at the bottom of the machine, the articles are free to drop out on a conveyer (not shown in the drawings). To insure the proper discharge of the formed articles, the dogs 37 project the plungers 32 downwardly as controlled by the stationary roller 39 (Fig. 16).

Although but one specific embodiment of this invention has been herein shown and described, it will be understood that numerous details of the construction shown may be altered or omitted without departing from the spirit of this invention as defined by the following claims.

I claim:—

1. A machine of the class described, comprising a supporting structure, a frame journaled in said supporting structure, means for imparting a step-by-step rotary movement to said frame, a plurality of die holders pivotally supported in said rotary frame, dies mounted in said holders, dies movably mounted in said supporting structure, means for simultaneously feeding a plastic material to one of said die holders and reciprocating said last-mentioned set of dies toward and away from another of said die holders, and cams for maintaining said pivoted die holders in horizontal position during both the feeding and forming operations.

2. In a machine of the class described, a support, a frame rotatably mounted on said support, means for rotating said frame, a plurality of die holders pivotally mounted on said frame, dies in said holders, guides on said support in position to be engaged by said die holders and suitably formed to cause said die holders to maintain a horizontal position during a portion of the rotation of said frame, and means for feeding a plastic material to the dies in said holders and forming articles therein while said die holders are in horizontal position.

3. A machine of the class described, comprising a supporting structure, a frame journaled in said supporting structure, means for imparting a step-by-step rotary movement in said frame, a plurality of dies pivotally supported in said rotary frame, dies movably mounted in said supporting structure, means for feeding a plastic material to said first-mentioned dies, means for reciprocating said last-mentioned dies toward and away from said first-mentioned dies, and cams for maintaining said pivoted dies in substantially horizontal position during both the feeding and forming operations.

4. A machine of the class described, comprising a supporting structure, a receptacle suitable for receiving a plastic material located in the upper part of said structure, dies movably mounted in said supporting structure, a frame journaled in said supporting structure, means for imparting a step-by-step motion to said frame, a plurality of die holders pivotally mounted on said frame, dies in said holders, said receptacle having outlets for feeding plastic material to the dies in said holders, a roller on each of said die holders, and tracks on said supporting structure in position to engage said rollers and thereby control the oscillation of said die holders with respect to the outlets in said receptacle and said plunger dies.

5. In a machine of the class described, the combination of a die holder having a plurality of dies supported therein, said die holder being formed to provide means for circulating a cooling fluid therethrough and in direct contact with the back of the dies, and means for projecting streams of air against the exposed forming surfaces of said dies.

6. In a machine of the class described, a support, a hollow axle journaled in said support, a frame secured to said axle, means for rotating said frame and axle, a plurality of hollow die holders pivotally mounted on said frame, dies in said holders, guides on said support in position to be engaged by said die holders and suitably formed to cause said die holders to maintain a horizontal position during a portion of the rotation of said frame, flexible connections between said hollow die holders and hollow axle whereby a cooling fluid may be conducted to and from said hollow axle and circulated through the die holders during oscillation thereof.

Signed at Chicago this 9th day of Oct. 1916.

CESARE BARBIERI.